United States Patent Office 3,217,394
Patented Nov. 16, 1965

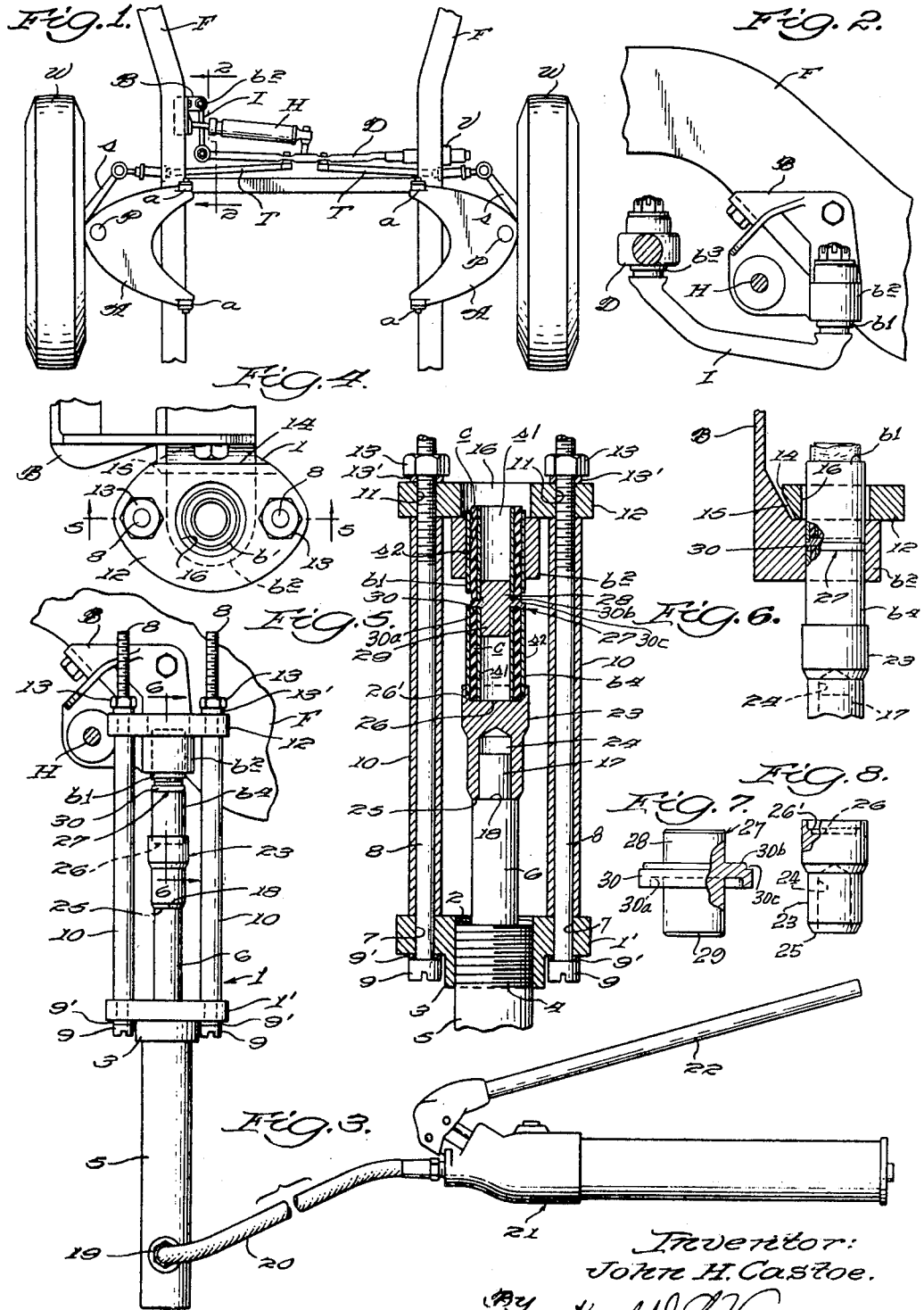

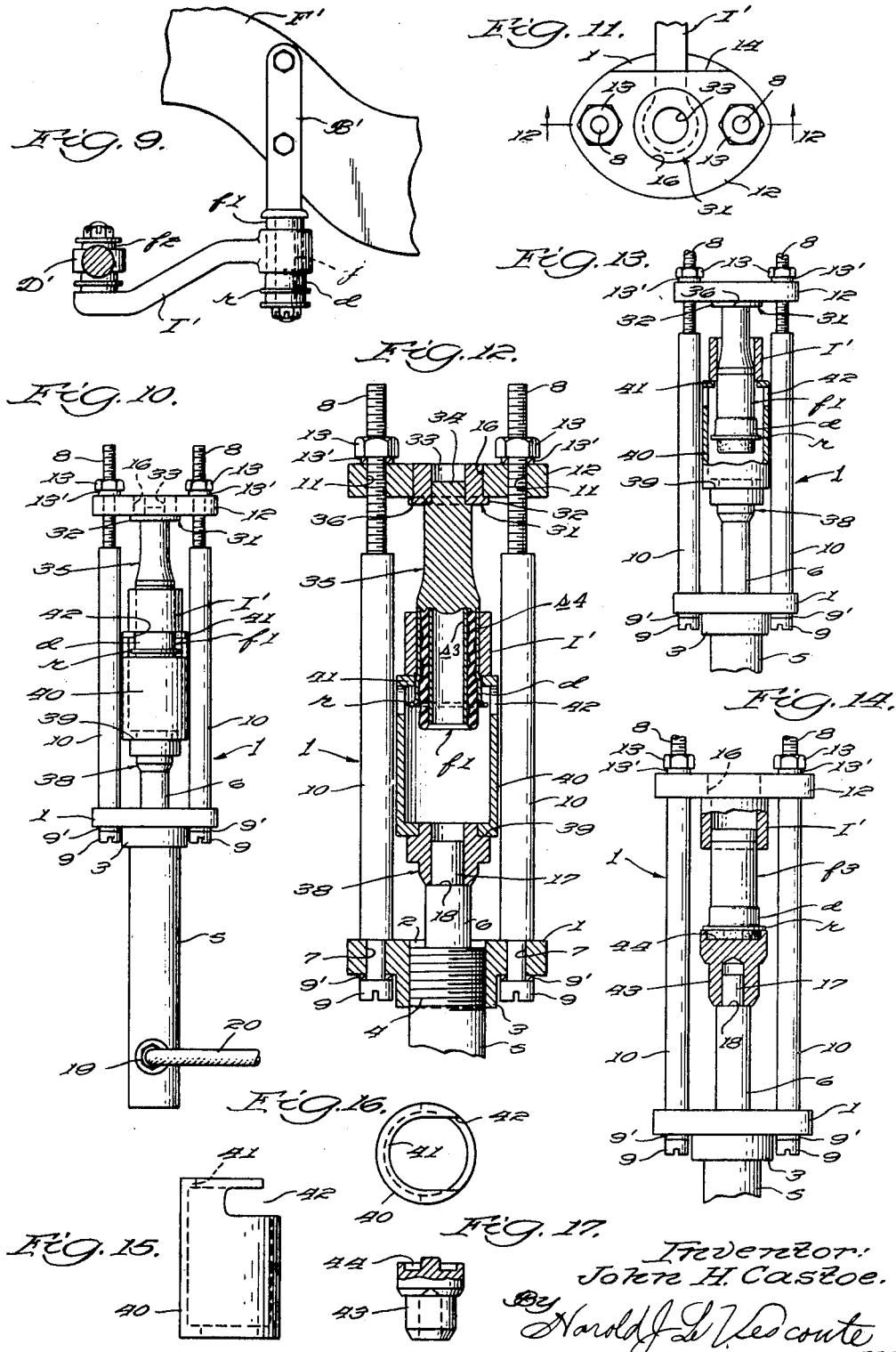

3,217,394
PRESSURE FLUID OPERATED BUSHING INSERTING AND REMOVING PRESS
John H. Castoe, 6718 Shady Grove St., Tujunga, Calif.
Filed May 19, 1964, Ser. No. 368,557
5 Claims. (Cl. 29—252)

This invention is a continuation-in-part of my co-pending application Serial No. 68,574, filed November 19, 1960, now abandoned, and relates to hydraulic pressure actuated tools and more particularly to a portable means for removing and installing press fitted bushings in situ on motor vehicles.

In the chassis of motor vehicles and particularly in certain joints of the steering means and spring shackles, vibration absorbing bushings are employed which comprise a thin metal outer shell and smaller inner bushing or shell mounted therein by an intervening wall of rubber bonded to both of the shells. These bushings are initially tightly pressed into place and service men have had a difficult time effecting replacement thereof. Even the vehicle manufacturer's service manuals suggest nothing other than removing the part in which the bushing is secured from the vehicle and replacing the bushing by the crude expedient of driving the old one out of and the new one into the member by a hammer and punch or other implements. All of the foregoing takes time and imposes unnecessary costs to the car owner.

Considering the foregoing factors, is is the principal object of the present invention to provide a small, portable, hydraulic press means which can be applied to a bushing holding component of the vehicle while that component is on the vehicle and which press means can be actuated both to force out a bushing to be removed and to force a replacement bushing into the chassis without imposing destructive stresses on the rubber component of the replacement bushing component.

Another object of the invention is to provide a small, portable, hydraulic powered press means mountable on various components of a vehicle chassis without removing the component from the chassis and including relatively moving frame and piston components each affording mounting for various adaptors whereby the device is readily arranged for various standard bushing removing and replacement operations on different vehicles and on different parts of vehicles and usable both with straight and flanged bushings.

Still another object of the invention is to provide a device in which the foregoing objectives are realized in practice, which is composed of few parts all of which are of simple design whereby the device not only is economical to manufacture but also does not require great skill to use and is effective for its intended purpose.

With the foregoing objects in view, together with such additional objects and advantages as may subsequently appear, the invention resides in the parts and in the construction, combination and arrangement of parts described, by way of example, in the following specification of a presently preferred embodiment of the invention, reference being had to the accompanying drawings which form a part of said specification and in which drawings:

FIG. 1 is a top plan view of the front end of a vehicle chassis to illustrate a typical point on a vehicle for which the device of the invention is particularly useful.

FIG. 2 is an enlarged, fragmentary cross sectional view taken on the lines 2—2 of FIG. 1, FIG. 3 is a side elevational view of a portion of the vehicle frame shown in FIG. 2 with the steering gear idler arm removed and the device of the invention mounted on the idler arm engaging bracket preparatory to removal of a straight bushing and the simultaneous insertion of another bushing in said bracket by use of the device and an accessory interposed between the replaced bushing and the replacement bushing, FIG. 4 is a top plan view of the device applied as shown in FIG. 3, the scale being that of FIG. 2, FIG. 5 is a medial, longitudinal sectional view taken on the line 5—5 of FIG. 4, FIG. 6 is a fragmentary medial sectional view taken on the line 5—5 of FIG. 4 showing the removed bushing substantially out of the idler arm bracket boss and the replacement bushing entering the boss, FIG. 7 is a side elevational view of a representative adaptor or connector member which is interposed between the replaced and the replacement bushings in the use of the device as shown in FIGS. 3 through 6, FIG. 8 is a side elevational view of a second adaptor which is interposed between the piston rod of the device and the replacement bushing in the use of the device shown in FIGS. 3 through 6, FIG. 9 is a fragmentary, side elevational view of another form of vehicle steering gear idler arm and the mounting thereof on the vehicle frame, FIG. 10 is a side elevational view showing the device applied to the bracket which engages one end of the idler arm shown in FIG. 9, the device being arranged to remove the bushing therefrom, FIG. 11 is a top plan view of FIG. 10 but on the same scale as FIG. 9, FIG. 12 is a sectional view taken on the line 12—12 of FIG. 11, FIG. 13 is a reduced scale section like FIG. 12 but showing the progress of bushing removal, FIG. 14 is a reduced scale section like FIG. 2 but showing the use of adaptors for the insertion of a replacement bushing, FIG. 15 is a side elevational view of a bushing receiving abutment means employed for operations where flange bushings are to be removed from a component by the use of the device, FIG. 16 is a top plan view of the abutment means shown in FIG. 15, and FIG. 17 is a side elevation partly in section of an adaptor for inserting flange replacement bushings such as shown in FIGS. 9 through 14.

Referring first to FIG. 1 of the drawings, there is shown a front end of a motor vehicle chassis including side frame members F, F, front wheels W, W mounted on axle members P, P to the A-frame structure including upper A-frame member A, A which are pivotally mounted for movement about horizontal axes $a$ to accommodate yielding vertical relative movement between the vehicle wheels and the frame structure. Steering arms $s$, $s$ formed integrally with the axle members are connected by tie rods T, T to a drag link D having one end thereof pivotally connected to one end of an idler arm I; the other end of said idler arm being pivotally connected to a bracket B carried by one of the frame members F. The steering of the vehicle is accomplished by a hydraulic ram device H one end of which is attached to the bracket B and the other end connected to the drag link D. The action of the hydraulic ram H is controlled by a valve device V which, in turn, is actuated both by the vehicle steering wheel and by the accommodating position of a component of the valve device actuated by the drag link D.

While the device of the present invention is particularly useful for the operations shown in the drawings and which will be described in connection with the description of the invention, it will be appreciated that the invention can be applied to other uses as well. The illustrated use of the device shown in FIGS. 2 through 6 is that of replacing the straight bushing $b1$ in the boss $b2$ of the bracket B and which is engaged by one end of the idler arm I. A similar straight bushing $b3$ is carried by the end of the drag link D and is engaged by the other end of the idler arm. The bushings b1 and b3 are mounted in the bracket and drag link, respectively with a tight press fit and, heretofore, the replacement thereof has required the complete removal of the bracket as well as the idler arm and the drag link so that the bracket and drag link could be worked on at a bench to remove the bushings and insert replacement bushings. Alternatively, attempts have been made to employ screw thread operated devices for removing and replacing the bushings in situ, but none have been successful. As before stated, the maintenance instructions of the car manfacturers recommend the crude practice of removing and replacing the bushings with a hammer and punch.

Referring to FIGS. 2 through 6, the illustrated embodiment of the device comprises a frame structure 1 including a base member 1' of modified oval configuration in plan and having a central threaded opening 2 extending therethrough and defined in part by an annular flange 3 and in which opening the externally threaded end 4 of a hydraulic cylinder 5 is engaged, the piston rod 6 of said cylinder extending from the said threaded end of the cylinder and through the threaded opening 2 in the base member.

The base member 1' is further provided with two diametrically opposite bores 7, 7 extending parallel to the central opening 2 and being equally spaced therefrom. Extending through the bores 7, 7 are bolts 8, 8 preferably having the heads 9, 9 thereof at the same side of the base member 1' as the cylinder 5. The bolts extend through elongated sleeves 10, 10 and thence through holes 11, 11 in a head member 12, and are provided with nuts 13, 13 threaded on the bolts to interconnect the base member 1', the sleeves 10, 10 and the head member 12 to form said frame structure which, as viewed in side elevation, is of elongated rectangular configuration with the bolts 8 and sleeves 10 forming the side members thereof. Spring washers 9', 9' are interposed between the bolt heads 9, 9 and the base member and corresponding spring washers 13', 13' are interposed under the nuts 13, 13.

The head member is generally of the same configuration in plan as the base member but for uses on bushing holding bosses which have limited lateral clearance as in the illustrated bracket B, one side thereof is cut away as shown at 14 and 15 in FIGS. 4 and 6. Additionally, the head member 12 is provided with a centrally disposed opening 16 which is slightly larger than the outside diameter of the bushing to be accommodated thereby. The piston rod 6 is provided with a reduced diameter end 17 constituting an adaptor supporting shank and providing a shoulder 18 for a selected one of various adaptors to be mounted thereon. The cylinder 5 at the end thereof remote from the threaded end 4 is provided with a fitting 19 affording connection with a conduit 20 leading to a combined hand pump and reservoir 21 operated by a reciprocable handle 22. The illustrated pump and reservoir is one which is available on the open market and, in fact, any hand operated pump capable of delivering sufficient fluid pressure may be used in connection with the device.

Having reference to FIG. 5, the bushings b1 and b4 comprise inner and outer concentrically disposed metal sleeves s1 and s2 separated by a layer of resilient rubber bonded thereto and constituting a vibration absorbing cushion c. In the use of the device for replacing a bushing in the boss b2 on the bracket B, the idler arm I is first removed from the bracket and drag link. With the piston rod 6 in retracted position, the head member 12 is placed over the boss b2. A bushing adaptor 23 having a socket 24 in which the adaptor supporting shank 17 of the piston rod is received and an end surface 25 engaging the piston rod shoulder 18 is placed on the piston rod. The opposite end of the adaptor 23 is provided with a shallow, annular socket 26 in which the outer sleeve s2 of the replacement bushing b4 is received said socket having a peripheral shoulder 26' engaging the said outer sleeve which, in the illustrated use is shorter than the inner sleeve s1 and the depth of said socket inwardly of the shoulder being such as to prevent harmful axial force being imposed on the inner sleeve or shell of the bushing. A connector member 27 is placed on the upper end of the bushing b4; said connector member having opposed cylindrical pilots 28 and 29 engaging the inner sleeves s1 of the bushings b1 and b4 and an annular flange 30 at about the midlength of said connector which is only slightly smaller in diameter than the outside diameters of the outer sleeves of the bushings. In the case of the particular bushing shown, the upper end of the inner sleeve extends slightly above the outer sleeve, wherefore, the lower face of the annular flange 30 is relieved as at 30a so that the force derived from the piston rod is transmitted directly from the outer sleeve of the replacement bushing b4 to the flange and thence to the outer sleeve of the bushing b1, the upper face of the flange 30 having a centering shoulder 30b and a peripheral ledge or seat 30c for the lower end of the outer shell of the replaced bushing b1. It will be understood that adaptors will, of necessity, vary in configuration to suit the sizes and contours of specific bushings on which the device is used it being important that in pressing in a bushing that the force be applied only to the outer sleeve to protect the rubber component against destructive stresses incident to pressing the bushing into place. It is to be remembered that when such replacement is made, the replaced bushing b1 is badly worn and the rubber cushion is at least almost completely torn apart, wherefore, only pressure on the outer shell can remove the bushing.

Having thus arranged the device, the replacement bushing and the connector member, the pump is actuated causing the piston rod 6 to rise and eventually the connector member pilot end 28 will enter the lower end of the inner shell of the bushing b1 as shown in FIGS. 3 and 5 and the centering shoulder 30b will cause the ledge 30c to engage the end of the outer shell thereof. Continued actuation of the pump will cause the reaction between the piston rod 6 and the frame structure to force the bushing b1 out of the boss b2, and through the opening 16 in the head member 12, the lower face of the flange 30 and the ledge 30c of the connector member 27, the outer shell of the bushing b4 and the adaptor 23 combining to serve as an extension of the piston rod for this purpose. As best shown in FIG. 6, this movement serves also to press the replacement bushing b4 into the bracket boss b2 in the same operation. When the replacement bushing has been pressed into place, a bypass valve (not shown) on the pump is opened and a piston retraction spring within the cylinder 5 will return the piston to retracted position with incident return of the hydraulic fluid to the pump reservoir. The device can then be removed from the boss b2. It is also similarly applied to the end of the drag link D for similar simultaneous removal and replacement of the bushing b3.

Referring next to FIGS. 9 through 17, the use of the device for removing and replacing flange vibration absorbing bushings is shown. In these figures, the hydraulic cylinder and piston and the frame structure is the same and therefore, all identical parts have been given the same numbers as in the preceding figures. The difference lies in the adaptors employed and in the mode of use of the device deriving from the fact that flanged bushings must first be removed and then the replacement bushing pressed into place in a separate operation.

Referring first to FIG. 9, there is shown a vehicle frame member F' on which an idler arm bracket B' is mounted, said bracket having a depending journal portion j engaged by the inner shell s3 of a flanged bushing f1, the outer shell s4 of said bushing having an enlarged diameter end $d$ terminating in a radial flange $r$. The body of the said outer shell is tightly pressed into one end of the idler arm I' and the following description relates to the use of the device and to typical adaptor elements for the removal of the above and similar flanged bushings; it being noted that the other end of the idler arm carries a stud extending through a similar flanged bushing $f2$ similar pressed into the end of the drag link D'.

In this use of the device, the bracket B' is disconnected and removed from the bushing $f1$. Due to the length of the illustrated bushing, the device of the invention is prepared for the operation by backing off the nuts 13, 13 as shown in FIGS. 10, 12 and 13. The opening 16 in the head member 12 is fitted with a first adaptor 31 having a flange 32 engaging the under side of the head member 12 and having an axially disposed hole 33 affording socket means for the shank portion 34 of a bushing end engaging adaptor 35 having a shoulder 36 engaging the under face of said first adaptor 31; said bushing end adaptor having a body of slightly greater length than the bushing to which it is to be applied and terminating in an end of slightly lesser diameter than the outer shell of the bushing $f1$ at the upper end thereof and being contoured to engage and apply axial force to the end of the outer shell of said bushing sufficient to remove it from the idler arm.

The adaptor supporting shank 17 and shoulder 18 of the piston rod are provided with an adaptor member 38 fitted thereon, the upper end of said adaptor having an annular seat 39 for the lower end of a large, hollow, cylindrical abutment member 40 having an inner diameter greater than the diameter of the flange $r$ and an internal length greater than the length of the bushing $f1$. Since in this instance, the portion of the idler arm to be engaged by the abutment member is of lesser diameter than the flange $r$, the upper end of the abutment member is provided with a shoulder 41 of lesser diameter than the interior of the abutment member and one side of the abutment member is cut away as at 42 to allow the abutment member to be applied to the idler army by lateral movement.

Assuming that the device with the various adaptors and abutment means has been mounted on the bushing $f1$, it will be evident that upon aplication of fluid pressure, the piston will, in effect, cause the cylinder 5 and the frame structure to move in the opposite direction pushing the bushing $f1$ downwardly out of the idler arm end and into the hollow abutment member 40. When this has been completed, the device is removed and the head member again clamped against the ends of the sleeves 10, 10 as shown in FIG. 14. The piston rod is provided with an adaptor 43 having a socket 44 engaging the flanged end of the outer shell of the replacement bushing $f3$ and, with the under face of the head member 12 engaging the upper face of the idler arm as in the first described use of the invention, actuation of the piston rod 6 will force the bushing $f3$ into position in the idler arm. Obviously, a similar sequence of operations will effect replacement of the similar flanged bushing $f2$ in the ends of the drag link D' which is engaged by the other end of the idler arm.

It will be obvious that the device is not necessarily limited to the two forms of bushings shown and that it is not necessarily used in exactly the position shown by way of illustration since, obviously, there may be uses in which the device will be in a horizontal plane or possibly inverted from the position shown in the drawings. The accommodation to different sizes and forms of bushings by use of suitable adaptors is also obvious as is the fact that with a shorter flanged bushing, there may be no necessity of extending the length of the frame. An important facet of the invention is that the press can be used both to push out bushings in directions both in the same direction as the pressure induced piston movement and opposite to such movement as particular bushing installations may require.

While in the foregoing specification, there has been disclosed a certain presently preferred embodiment of the invention and illustrative modes of use thereof, it is not to be inferred therefrom that the invention is limited to the exact details of construction and use thus disclosed by way of example. Accordingly, it will be understood that the invention includes as well, all such changes and modifications in the parts and in the construction, combination and arrangement of parts as shall come within the purview of the appended claims.

I claim:

1. In a press for removing and replacing press fitted, vibration absorbing bushings, of the type comprising cylindrical inner and outer rigid sleeves with an interposed layer of rubber, disposed in a bushing carrying component of a vehicle chassis while the bushing carrying component remains secured to the chassis, a press frame structure of elongated rectangular configuration and comprising a base member and a head member, respectively forming the opposite ends of said frame structure and side members for said frame structure extending between and conecting said base and head members, a hydraulic cylinder carried by said base member and having a piston rod reciprocable therein and including a portion of said rod disposed parallel to and midway between said side members; the exposed end of said piston rod being shaped to interchangeably support a bushing engaging means adapted to apply endwise force to the outer shell only of a bushing or to support a means engagable with the surface surrounding a bushing carrying component of a vehicle chassis at the side of the vehicle chassis component which is adjacent to said head member and said base member having a vehicle chassis component engaging surface at the side thereof adjacent to said base member and an opening extending therethrough in axial alignment with said piston rod; said opening and said component engaging surface additionally affording optional supporting means for a bushing engaging means for applying axial force to the outer shell of a bushing which is to be removed from said component by relative movement of said bushing out of said component toward said base member in response to force imposed by said hydraulic cylinder.

2. A bushing removing and replacing press as claimed in claim 1 in which said piston rod is provided with bushing end engaging means adapted to engage and apply axial force directly only to the end of the outer shell of a bushing to be inserted, and in which said opening in said head member affords clearance for entrance of at least the end of a bushing projected beyond the side face of the component which is engaged by said head member incident to activation of said piston rod toward said head member.

3. A bushing removing and replacing press as claimed in claim 1 in which said surface and said opening in said head member serve as a mounting means for a bushing outer shell engaging means mounted thereon, in which said rod carries a means for engaging the surface of a chassis component from which a bushing is to be removed, and in which said last named means at least partially surrounds the bushing carrying opening in the component and affords clearance space for the movement of the removed bushing out of the component opening toward said piston rod.

4. A bushing removing and replacing press as claimed in claim 1 in which said side members comprise bolts extending through aligned openings parallel to and at opposite sides of the axial line of said piston rod and in which said bolts carry nuts adjustable therealong operable to increase or decrease the length of said frame structure to accommodate varying lengths of bushings and chassis bushing carrying component engaging means.

5. In a press for removing and replacing press fitted, vibration absorbing bushings, of the type comprising cylindrical inner and outer sleeves with an interposed layer of rubber disposed in a bushing carrying component of a vehicle chassis while said component remains secured to the vehicle chassis, a frame structure of rectangular configuration open at opposite sides for the reception of the bushing carrying portion of the chassis component; said frame structure comprising a base member forming one end of said frame structure, a head member forming the other end of said frame structure spaced from and extending parallel to said base member, and a pair of spaced, parallel bolts extending between and interconnecting said members and constituting the side members of said frame structure, a hydraulic actuating means carried by said base member and including a reciprocable rod having an end moving in a path parallel to and at least substantially intermediate the axial lines of said bolts and within the space between said members, means on said head member for engaging the end face of a bushing carrying component into which a bushing is to be pressed and bushing end engaging means on said end of said rod effective to apply axial force to guide and support a bushing being press fitted into the component by movement of said rod by engagement only with the outer sleeve component of the bushing.

References Cited by the Examiner
UNITED STATES PATENTS 2,807,081  9/1957  Black _____ 29—252

FOREIGN PATENTS 154,829  12/1920  Great Britain.

OTHER REFERENCES

Blackhawk Service Manual No. 239 P., published by Blackhawk Mfg., Milwaukee, Wis., October 1940. Fig. 89 on page 27, Fig. 133 on page 39 and page 4.

WILLIAM FELDMAN, *Primary Examiner.*

MYRON C. KRUSE, *Examiner.*